(12) United States Patent
Mach et al.

(10) Patent No.: US 10,440,966 B2
(45) Date of Patent: Oct. 15, 2019

(54) APPARATUS FOR FILLING TUBULAR CASES

(71) Applicant: VEMAG Maschinenbau GmbH, Verden/Aller (DE)

(72) Inventors: Matthias Mach, Hannover (DE); Jan-Nils Hagedorn, Verden (DE); Heiner Matthies, Kalbe (DE); Olaf Grote, Eystrup (DE); Alexander Lewin, Verden (DE)

(73) Assignee: VEMAG Maschinenbau GmbH, Verden (DE)

( * ) Notice: Subject to any disclaimer, the term of this patent is extended or adjusted under 35 U.S.C. 154(b) by 0 days.

(21) Appl. No.: 16/116,406

(22) Filed: Aug. 29, 2018

(65) Prior Publication Data

US 2019/0059402 A1    Feb. 28, 2019

(30) Foreign Application Priority Data

Aug. 31, 2017    (DE) .................... 10 2017 120 108

(51) Int. Cl.
*A22C 11/00*    (2006.01)
*A22C 11/02*    (2006.01)

(52) U.S. Cl.
CPC ...... *A22C 11/0227* (2013.01); *A22C 11/0218* (2013.01); *A22C 11/0263* (2013.01)

(58) Field of Classification Search
CPC ..... A22C 11/00; A22C 11/001; A22C 11/008; A22C 11/02; A22C 11/0209; A22C 11/0218; A22C 11/10
USPC ................... 452/30–32, 35–37, 46–48, 51
See application file for complete search history.

(56) References Cited

U.S. PATENT DOCUMENTS

| | | | | |
|---|---|---|---|---|
| 3,540,075 A | * | 11/1970 | Menne ................. | A22C 11/107 452/47 |
| 5,147,239 A | * | 9/1992 | Staudenrausch ....... | A22C 11/10 452/47 |
| 5,830,051 A | * | 11/1998 | Kasai ................... | A22C 11/108 452/48 |
| 6,080,054 A | * | 6/2000 | Muller ................ | A22C 11/006 452/29 |
| 6,439,990 B1 | * | 8/2002 | Kasai ................... | A22C 11/107 452/46 |

(Continued)

FOREIGN PATENT DOCUMENTS

DE    202013010285 U1    3/2015

*Primary Examiner* — Richard T Price, Jr.
(74) *Attorney, Agent, or Firm* — Wood Herron & Evans LLP (57) ABSTRACT

An apparatus is provided for filling tubular cases with a pasty material, in particular gathered sausage skin casings with sausage meat. The filling apparatus includes at least one filling tube on to which a case which can be filled with the material can be pulled, a receiving portion receiving a first end of the filling tube, a casing braking unit which is associated with the oppositely disposed second open end and which can be brought into operative connected relationship with the case which has been pulled over the filling tube, and a support device arranged at the receiving portion for the filling tube. The support device has at least one support portion which is variable in spacing relative to the receiving portion and which is adapted to be brought into contact with a gathered case on the filling tube for receiving transverse forces.

20 Claims, 6 Drawing Sheets

(56) References Cited

U.S. PATENT DOCUMENTS

| | | | | |
|---|---|---|---|---|
| 6,514,134 B1* | 2/2003 | Krompholz | .......... | A22C 11/107 |
| | | | | 452/30 |
| 7,381,123 B2* | 6/2008 | Bachtle | ................ | A22C 11/107 |
| | | | | 452/46 |
| 7,704,131 B1* | 4/2010 | Malenke | ............... | A22C 11/107 |
| | | | | 452/46 |
| 8,641,484 B1* | 2/2014 | Weers | .................. | A22C 11/107 |
| | | | | 452/46 |

* cited by examiner

Fig.11

APPARATUS FOR FILLING TUBULAR CASES

CROSS-REFERENCE TO RELATED APPLICATION

This application claims priority to German Application No. 10 2017 120 108.4, filed Aug. 31, 2017. The above-mentioned patent application is incorporated herein by reference in its entirety.

TECHNICAL FIELD

The invention relates to an apparatus for filling tubular cases with a pasty material, in particular gathered sausage skin casings with sausage meat. The invention further relates to a support device for at least one filling tube of an apparatus for filling tubular cases with pasty material, as well as a filling machine for producing sausages of pasty material.

BACKGROUND

Apparatuses for filling tubular cases are usually employed on filling machines for producing strings of sausages, by which a pasty material like sausage meat or the like is introduced into or put into tubular cases. The operation of introducing the pasty material into the tubular case can be conducted continuously or in portion-wise fashion so that the pasty material is introduced into the tubular case as an on-going procedure or cyclically. An artificial casing or a natural skin casing can be used as the tubular case. The term pasty material is used in the present case to denote a foodstuff material which is capable of flow and which can be transported by way of a tubular conduit. A dough material is also to be interpreted as the pasty material for example besides a meat or sausage material.

During the operation of filling the tubular case the case which has already been filled is divided up or twisted off at predetermined spacings so that separating locations are generated between the respectively filled case portions. The filled case thus has string portions which are separated from each other and which are of the same weight and preferably the same length. The string portions which are subdivided from each other are then usually separated from each other, thereby resulting in individual string portions which are referred as sausages and which for example are fed to a packaging machine for further processing.

To be able to fill the tubular case it is firstly to be pulled on to a filling tube of a filling apparatus, in which case the tubular case is gathered or shirred so that the gathered case which predominantly involves artificial casing, also referred to hereinafter as the gathered sausage skin casing, is shorter than the filling tube. The gathered cases can be of different diameters, also referred to as calibers. By a conveyor device which is preferably disposed upstream of the filling apparatus the pasty material is pressed through the filling tube into the tubular case which is closed at the end. By virtue of the material being introduced into the case the case is gradually pulled away from the open end of the filling tube and then the filling tube which for example is rotatable and drivable, together with the case which is still disposed thereon, is rotated about its longitudinal axis to produce the twisting-off location thereon.

For equipping a filling tube with a fresh tubular case, which is conducted using a casing gripping device or a casing loading unit, the empty filling tube is to be pivoted into a loading position. A filling tube which is fitted with a gathered case is in turn to be moved into a filling position. In the pivotal movement of the empty filling tube and the filling tube with the case thereon, it can easily start to oscillate to that the operation of applying a fresh gathered case by a casing gripping device or a casing loading unit or bringing the case which has already been fitted on the filling tube into contact with a casing braking unit, is made more difficult.

Such a casing braking unit holds the case taut when filling it with the pasty material, that being conducted by the filling tube moving with the case with its free end into the casing braking unit. If then the free end of the filling tube is not in central relationship with the casing braking unit, the front end of the case can buckle, or the filling tubes can suffer damage.

One example of a conventional device is shown in DE 20 2013 010 285, which discloses an apparatus for filling tubular cases of the above-indicated kind, having a support device arranged at the receiving portion for the filling tube and being coupled to a casing entrainment ring which is displaceable along the filling tube and which is in contact with the open end of the gathered case. The support device known from DE 20 2013 010 285 however only provides an adequate supporting action if the casing entrainment ring is disposed near the open end of the filling tube. That however is the case only when the filling tube is not fitted with a case thereon. If, however, the filling tube is carrying a gathered case, also referred to as the gathered sausage skin casing, the casing entrainment ring is in a position near the receiving portion for the filling tube. As a result, the open end of the filling tube in the case-carrying condition is almost free-floating. Upon the free case-carrying end of the filling tube being brought into contact with a casing braking unit, unintended contact between the two components can occur by virtue of non-alignment of the casing braking unit and the filling tube or by virtue of buckling of the gathered case.

With that background in mind, it would be desirable to provide an apparatus for filling tubular cases and a support device for a filling tube and a filling machine for producing sausages in such a way that, irrespective of whether the filling tube is or is not equipped with a case, the support action at the filling tube is improved to achieve enhanced process reliability during operation of the filling apparatus.

SUMMARY

According to one embodiment of the invention, an apparatus for filling tubular cases is provided. The apparatus includes a support device that has at least one support portion which is preferably variable in spacing relative to the receiving portion and which is adapted to be brought into contact with a gathered case on the filling tube for receiving transverse forces.

The invention achieves technical advantages over conventional designs based on the realization that, by a support portion which is arranged at the support device and which is variable in its spacing relative to the receiving portion and which can be brought into contact with a case which has been gathered on the filling tube, in particular with the outside periphery thereof, the filling tube is laterally supported at the free end during its pivotal movement when the filling tube is equipped with a gathered case and thus an additional load acts on the filling tube. In one aspect, the support portion bearing against the outside of the case is variable in its spacing relative to the receiving portion in such a way that, when the filling tube equipped with a gathered case is brought into contact at its free end with the casing braking unit, the support portion is moveable by being brought into contact with the casing braking unit, along the filling tube. The operation of bringing the casing braking unit into contact with the filling tube is conducted by a relative movement of the two components with respect to each other, at least one of the components being moved. Besides a support function during the pivotal movement of the filling tube the support portion at the same time also performs the function of a centering device. The support portion is preferably associated with the free end and is adapted to orient the open or free end of the case-bearing filling tube with respect to the casing braking unit which is to be brought into contact with the filling tube. In a preferred embodiment the filling tube is rotatable and drivable about its longitudinal axis and is thus rotatably moveably carried at the twisting-off head. In another embodiment the filling tube is stationary.

In one aspect, the support portion has at least one support surface at least partially surrounding the case on the filling tube. Lateral deflection of the filling tube in particular is counteracted with the support surface of the support portion. The lateral deflection movement is not entirely prevented with the support portion according to the invention but is limited to such an extent that the free end of the filling tube can only be deflected laterally to such an extent that exclusively elastic deformation occurs there. In that respect the wall of the gathered case is disposed between the support surface which preferably bears almost without any gap against the outside of the gathered case and the outside of the filling tube.

In another aspect, the support portion has a support surface which can be brought region-wise into contact with the outside periphery of a casing entrainment ring displaceable along the filling tube. The support portion is thus adapted to be brought into contact with a casing entrainment ring which has approached the free end of the filling tube, to carry transverse forces. The filling tube is supported laterally by the support portion which can be brought into contact with the casing entrainment ring, when the gathered case has been drawn off the filling tube after the case has been filled. In that arrangement in a preferred embodiment of the invention the casing entrainment ring which is displaceable along the filling tube travels into a portion of the region of the support portion, that has a support surface. Here too preferably an almost gap-free connection is produced between the casing entrainment ring on the filling tube and the support surface on the support portion. The movement of the casing entrainment ring into at least a region of the support portion provides that the casing entrainment ring can be displaced as far as the open or free end of the filling tube. Preferably the support portion at the free end of the filling tube moves over approximately a quarter or a fifth of the length of the filling tube.

In yet another aspect, the support surfaces respectively form a receiving space, preferably a cylindrical receiving space, for the gathered case and the casing entrainment ring which is displaceable along the filling tube. Accordingly, the support portion preferably has support surfaces surrounding both the case and the casing entrainment ring over their full peripheries, whereby deflection of the filling tube in any lateral direction, preferably perpendicularly to the longitudinal axis of the filling tube, can be reliably absorbed.

In some embodiments, the support surfaces have one or more slots extending in the longitudinal direction of the filling tube, in particular parallel to the direction in which the filling tube extends. Preferably a cylindrical receiving space is formed for the gathered case and a cylindrical receiving space is formed for the casing entrainment ring, on the support portion, which spaces are preferably of differing diameters. The receiving spaces involve an axial displacement relative to each other, with the longitudinal axes of the receiving spaces being arranged coaxially.

In another aspect, the support portion is a support sleeve with one or more support surfaces for the gathered case and/or the casing entrainment ring. With the support portion being in the form of a support sleeve, that provides a structurally simple option for uninterrupted lateral support for the filling tube, during the pivotal movement of the empty or case-bearing filling tube at the filling apparatus. In that case the support sleeve surrounds the filling tube irrespective of whether the filling tube is equipped with a gathered case thereon or whether the filling tube is empty, by virtue of a filling operation which has been terminated immediately before. The support sleeve is of such a configuration and is so adapted that the filling tube is supported by way of the case portion which is pulled on to same or centered thereon or is held by a casing entrainment ring which is displaceable along the filling tube in a suitably straight-lined orientation with respect to its end which is preferably rotatably accommodated at the receiving portion. The support portion is adapted to be moveable along the filling tube in order not to impede fitting the filling tube with a gathered case or sausage skin casing or bringing the open end of the occupied filling tube into contact with the casing braking unit.

In a further aspect, the support portion does not have its own specific drive for moving the support portion along the filling tube.

In some embodiments, the support portion has a centering portion for the casing entrainment ring which can be received portion-wise in the receiving space. By way of the centering portion, this arrangement, in particular when the casing entrainment ring moves into the receiving space of the support portion in the form of the support sleeve at the end of the filling operation, ensures that, when a filling tube is not exactly oriented in relation to the support sleeve, a casing entrainment ring which is moved along the filling tube does not travel so far as to encounter an end face of the support portion in the form of the support sleeve. Preferably the centering portion has an entrance portion which narrows conically in the direction of the free end of the filling tube and which then merges into the receiving space of constant diameter for the casing entrainment ring. In a preferred embodiment of the invention the casing entrainment ring has an approach surface which corresponds to the centering portion on the support portion and which is preferably also conical or tapered.

In one aspect, the support portion has a guide slide moveable along a guide of the support device, said guide extending parallel to the longitudinal axis of the filling tube. With the use of a guide slide the support portion can preferably be moved in a guided manner along the filling tube, wherein the guide slide is preferably carried slidingly moveably along the guide of the support device. The spacing of the support portion relative to the end of the filling tube is thus easily adjustable or variable and at the same time the guide slide ensures exact orientation of the support portion relative to the longitudinal axis of the filling tube which is preferably carried rotatably and in a drivable manner at the receiving portion of the apparatus. The guide slide and the guide of the support device, that carries the guide slide, are preferably mounted relative to each other by way of a sliding or rolling bearing. The guide preferably non-rotatably carries the guide slide together with the support portion. In a configuration of the invention the position of the displaceable carried support portion is adapted in dependence on for example a casing braking unit or a casing loading unit, which can be brought into contact with the free end.

In another aspect, disposed on the support portion is an entrainment member by which the support portion is moveable along the filling tube in specifically targeted fashion. By virtue of the support portion not having its own drive for an adjustment movement in the longitudinal direction the movement of the support portion is produced by other driven components of the apparatus. The entrainment member can be a material projection which is provided on the support portion or on the guide slide of the support portion and which for example engages or corresponds to an abutment portion on a component of the apparatus according to the invention, that moves the support portion.

In yet another aspect, the entrainment member can be coupled to a portion of the casing braking unit or the casing loading unit for a movement of the support portion along the filling tube. In particular, the component of the filling apparatus according to the invention, which can be brought into contact with or in operatively connected relationship with the filling tube, preferably has an abutment portion which corresponds to the entrainment member and which moves the support portion into a position correspondingly required on the apparatus. The entrainment member on the support portion is of such a design configuration that the support portion is adapted to be moveable in both directions along the filling tube on the support device by at least one of the components, namely the casing braking unit or the casing loading unit. Therefore, movement or adjustment of the support portion is conducted in each case in specifically targeted fashion by way of the component of the filling apparatus, that has its own drive device, namely the casing braking unit or the casing loading unit, so that according to the invention the support portion does not need its own drive. In a further embodiment of the invention the casing loading unit and the casing braking unit are stationary. Axial movement of the filling tube and actuation of the entrainment member moving the support portion are conducted by way of the receiving portion which is in the form of the twisting-off head and which is moved in the longitudinal direction of the filling tube.

According to one configuration of the invention, the support portion is adapted to be moved in the direction of the receiving portion before or during the operation of pulling the tubular case on to the filling tube, preferably by a casing loading unit. That ensures that the support portion does not impede the operation of pulling a case on to the filling tube or applying the case to the filling tube during the operation of loading it with a fresh gathered case or sausage skin casing. For that purpose, the casing loading unit has an adjusting member which acts against the entrainment member on the support portion and displaces a guide slide of the support portion along the guide on the support device in a predetermined angular orientation in the longitudinal direction of the guide on the support device.

In one aspect, the support portion is disposed in the region of the open end of the filling tube during filling of the tubular case and/or during the pivotal movement of the filling tube. The support portion thus in particular always supports the open end of the filling tube and the front end of a sausage skin casing which has already been pulled on to the filling tube, when there are transverse forces or forces acting laterally on the filling tube, preferably during the pivotal movement of the filling tube, by way of the receiving portion, or when the filling tube is brought into contact with the casing braking unit and the subsequent operation of filling the tubular case. When the free end of the filling tube is brought into contact with the casing braking unit the filling tube is supported at the support surface of the support portion by way of the gathered case or sausage skin casing which has been drawn on to the filling tube. In a further embodiment in contrast the empty filling tube is supported in relation to the support portion during the pivotal movement of the filling tube by the casing entrainment ring which has approached the free end of the filling tube. Instead of the case which has then already been completely withdrawn from the filling tube the casing entrainment ring fills up the free space between the support surface on the support portion and the filling tube.

In another aspect, associated with the support portion is a return means which is adapted to move the support portion into a predetermined position relative to the filling tube after the case has been pulled on. After the return movement of the casing loading unit and stoppage of the adjusting movement by the casing loading unit, that thus acts on the support portion, automatic return movement of the support portion into a predetermined position on the filling tube is implemented. By the return member the support portion is moved preferably near the second free end on the filling tube. From that position the support portion if necessary is moved out of its front position by the casing braking unit or the casing loading unit. In another configuration the support portion is moved by way of the casing entrainment ring in the direction of the free end of the filling tube.

In some embodiments, the return means is a spring element coupled to the guide and the guide slide of the support portion, this permitting a structurally simple design configuration for affording a return means. With the movement of the support portion out of a neutral position which is the result afforded by the return means, a return force is generated at the spring element, which becomes correspondingly greater, the further the support portion is moved out of its neutral position.

The support portion can be equipped with an insert which is matched in inside diameter to the caliber of the case to be processed. That ensures that the support surface for the case which has been pulled on to the filling tube can be adapted in a simple fashion without having to replace the complete support portion on the apparatus. The insert which is replaceable on the support portion is of a sleeve-like configuration and in particular extends over a portion along the inside diameter of a support portion which is preferably in the form of a support sleeve. In an embodiment the sleeve-like insert at its radially outer periphery has radially outwardly projecting projections. They engage for example into recesses provided at the inside of the support portion, thereby providing for an arresting action in the axial direction and in the peripheral direction of the support portion.

In a further aspect, each guide has one or more guide struts arranged in a stationary manner at the receiving portion. In particular, the guide slide of the support portion is guided along the guide struts. In a possible embodiment the arrangement has two guide struts as guide means for the guide slide of the support portion, thereby affording automatic orientation of the support portion arranged on the guide slide in relation to its radial orientation with respect to the filling tube on the filling apparatus. Preferably the guide strut or struts are of a cylindrical cross-section, wherein the at least one guide strut preferably extends over at least two thirds of the overall length of the filling tube, preferably over more than three quarters of the overall length of the filling tube so that the support portion can support almost every portion of the respective filling tube.

In one aspect, a plurality of filling tubes is arranged on the receiving portion, wherein each filling tube is mounted by way of a support portion which is arranged at a spacing relative to the receiving portion and thus relative to the mounted end of the filling tube. The use of a plurality of filling tubes which are preferably rotatable and drivable about their longitudinal axis provides for a filling operation which is improved in relation to economy, at the filling apparatus according to the invention. At the moment at which a fresh tubular case is pulled or pushed on to a filling tube, the filling operation in respect of the case pulled thereon can be implemented at the respective other filling tube. Preferably the filling apparatus at the receiving portion has two or three filling tubes. By virtue of using a support portion which is preferably moveable along a respective filling tube, at each of the filling tubes, the second mounting point which is preferably in the form of a floating bearing for the filling tubes ensures that none of the filling tubes mounted in a drivable manner at the receiving portion is bent transversely relative to the longitudinal direction when a fresh tubular case is being pulled on to the filling tube or upon its being brought into contact with the casing braking unit. In addition, the filling tubes which are stabilized with the support device are held for example in an accurate position relative to the casing gripping device or the casing braking unit, which simplifies the operation of pulling or pushing a fresh tubular case on to the filling tube and/or bringing the open end of a respective filling tube into contact with the casing braking unit.

According to some embodiments, the receiving portion has a pivotal plate which is mounted moveably at the apparatus and at which the filling tube is preferably arranged in horizontally projecting relationship. With the moveable mounting for the pivotal plate on the apparatus it is easily possible for the filling tube on which a fresh tubular case is to be pulled to be moved out of its filling position on the filling apparatus according to the invention, in which the operation of filling the tubular case is usually carried out. That provides an improved freedom of movement for for example a casing loading unit which carries out the operation of pulling the tubular case on to the respective filling tube. Preferably the pivotal plate has a plate plane at which the filling tube projects preferably perpendicularly therefrom. That provides a structurally simple mounting arrangement for the filling tube with its end mounted rotatably at the receiving portion.

In another aspect, the receiving portion is in the form of a twisting-off head having an axis of rotation which is respectively oriented parallel to the axis of rotation of the filling tube. A pivotal movement of the filling tube on the filling apparatus, that is structurally simple to implement, is achieved by virtue of the axis of rotation of the twisting-off head extending parallel to the axis of rotation of the filling tube. A simple rotary movement of the twisting-off head about its axis of rotation can provide that a respective filling tube which is to be freshly fitted with a case can be moved out of its filling position. The filling position is the position of the filling tube on the filling apparatus, in which the filling tube is brought into contact with the casing braking unit during the filling operation. The filling tube is moved into a position in which there is sufficient freedom of movement for the casing loading unit which fits the tubular case on to the filling tube. The pivotal plate of the twisting-off head is preferably of a circular shape on which at least one filling tube is arranged, preferably two or more filling tubes being arranged equally spaced thereon and also being disposed symmetrically relative to the axis of rotation of the pivotal plate. During the pivotal movement of the pivotal plate with the rotatable and drivable filling tubes arranged thereon, this therefore provides for a uniform distribution of forces. By the support portions which additionally support the filling tubes the pivotal movement can be carried out at a high speed without the risk of the filling tubes being caused to oscillate in such a way that permanent deformation occurs at the filling tubes and/or the gathered tubular cases buckle.

In yet another aspect, the support device has a central strut which is arranged coaxially relative to the axis of rotation of the receiving portion and in relation to which the guide struts of a respective guide are arranged in parallel relationship. With the use of a central strut and the guide struts extending parallel thereto, this provides a firm frame-like structure for the support device for the filling tubes which are arranged on the receiving portion of the apparatus, at the same time affording a high level of structural strength. This provides for exact orientation of the filling tubes relative to the receiving portion. The guide struts of a respective guide arrangement are oriented parallel to the central strut of the support device, whereby the moveably carried support portions are guided precisely and exact centering of the filling tubes which otherwise are rotatably and in a drivable manner carried only at one end is possible. In a preferred configuration of the invention the free ends of the guide struts are coupled to the central strut by way of a connecting flange.

In a further aspect, a guide portion of the casing braking unit, that is moveable portion-wise along the central strut, is arranged at the free end of the central strut. The guide portion engaging the central strut provides a coupling between the support device and the casing braking unit, thereby implementing preferably exact orientation of the casing braking unit with the support device of the filling apparatus according to the invention. In a possible embodiment the guide portion serves at the same time as a return means for the support portion as the guide portion of the casing braking unit can preferably be coupled to the entrainment member of a respective support portion.

In another embodiment of the invention, a support device is provided for at least one filling tube of an apparatus for filling tubular cases with pasty material, in particular gathered sausage skin casings with sausage meat, which is distinguished by a support portion for the filling tube, which can be arranged variably in the longitudinal direction of the filling tube in the spacing relative to a receiving portion rotatably receiving the filling tube and is adapted to be brought into contact with a gathered case on the filling tube for receiving transverse forces, and wherein the support device is adapted for use on an apparatus for filling tubular cases in accordance with the above-described preferred embodiments. Such a support device according to the invention with its at least one support portion moveable in the longitudinal direction of the filling tube preferably provides a second mounting point which in particular supports the free end of the filling tube when the filling tube is pivoted by way of the receiving portion, so that lateral forces act on the filling tube or the second free end of the filling tube is brought into contact for example with a casing loading unit or a casing braking unit. In the pivotal movement in particular forces are absorbed and the deflection of the filling tube transversely relative to its longitudinal axis is limited. When contact is made with for example the casing braking unit or the casing loading unit the support portion of the support device performs an orientation or centering function at preferably the free end of the filling tube. The support device can preferably be carried rigidly at a receiving portion, in the form of a pivotal plate, of a filling apparatus as described hereinbefore.

Advantageous developments of the support device according to the invention will be apparent from the foregoing description and the above-described developments relating to the filling apparatus according to the invention and the preferred embodiments thereof.

In another embodiment of the invention, a filling machine is provided for the production of sausages of pasty material, in particular sausage meat, including at least one filling hopper for receiving the pasty material, a conveyor pump for conveying the pasty material and an apparatus for filling tubular cases with a pasty material, in particular gathered sausage skin casings with sausage meat, in accordance with one of the above-described embodiments, and preferably having at least one casing loading unit for gathered sausage skin casings with two gripping elements which are mounted moveably relative to each other.

On a filling machine having such a filling apparatus designed in accordance with the invention, the reduced flexural loading at the filling tubes provides for improved process reliability during production of the sausages. The support sleeve prevents buckling of the tubular, preferably gathered case which is drawn on to the filling tube, in the pivotal movement of the filling tube. In addition, the risk of bending of the filling tube transversely relative to its longitudinal axis while the tubular case is being pulled on to the filling tube or upon being brought into contact with a casing braking unit at the open end of a respective filling tube is eliminated with the support portion which is preferably displaceable along the filling tube. In addition, the support portion prevents oscillation of the filling tube upon and after the pivotal movement. To be able to uniformly grip the sausage casings at the filling machine for pulling the cases on to the at least one filling tube, the gripping elements which receive the gathered cases are preferably mounted rotatably along at least one lever elements or are carried by way of a stroke linkage in parallel and linear relationship variably in height relative to each other. Advantageous configurations of the filling machine are to be found in the foregoing description relating to the filling apparatus according to the invention and the preferred embodiments thereof. Furthermore, these various aspects and embodiments can be combined in any combination, so long as the apparatus and/or filling machine achieves the technical advantages described above.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

Figure 1:
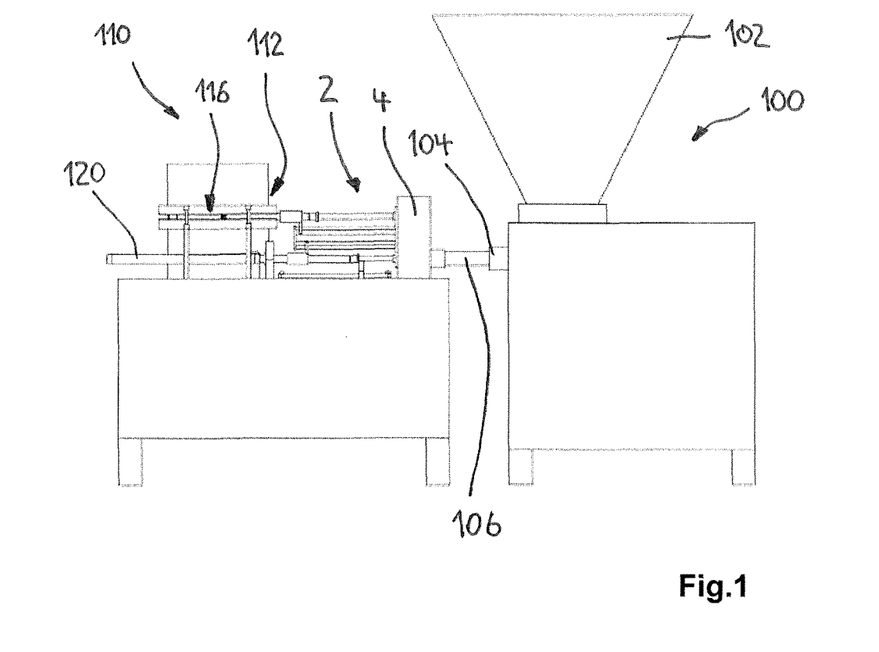
FIG. 1 shows a front view of a machine for filling tubular cases with a filling apparatus according to one embodiment of the invention.
Figure 2:
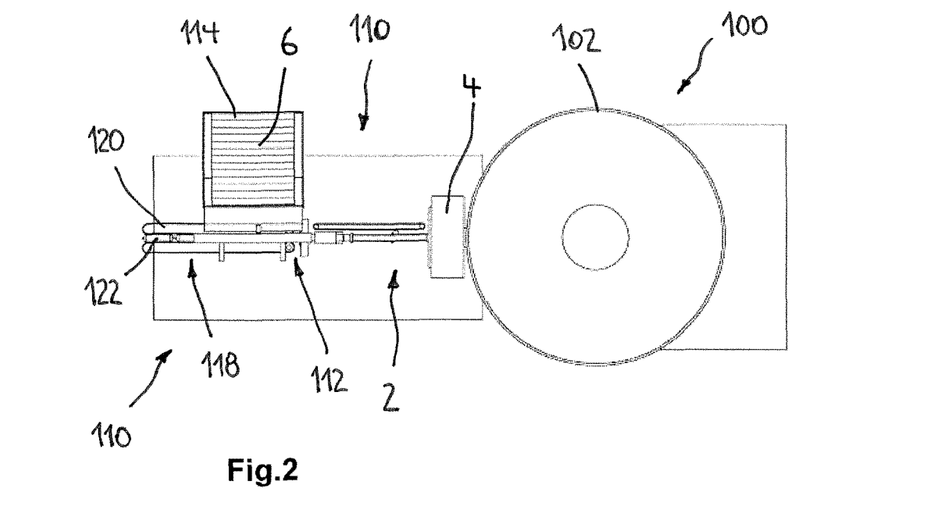
FIG. 2 shows a plan view of the filling machine and the filling apparatus of FIG. 1.

FIGS. 1 and 2 show a machine 100 for filling tubular cases, in particular artificial or natural sausage casings, in conjunction with an attachment 110, at which a filling apparatus 2 and a casing loading unit 112 are arranged. The machine 100 further has a filling hopper 102 and an extrusion head 104 which is coupled in material-conducting relationship to a twisting-off head 4 of the filling apparatus 2 by way of a delivery tube 106. The casing loading unit 112 includes a case magazine 114 for a plurality of gathered tubular cases 6, such as gathered artificial sausage casings, and a case gripping device 116. In addition, arranged at the attachment 110 is a conveyor device 11R having two conveyor elements 120 extending at a spacing relative to each other in a horizontal plane for the sausages 122 produced by the filling apparatus 2.

Figure 3:
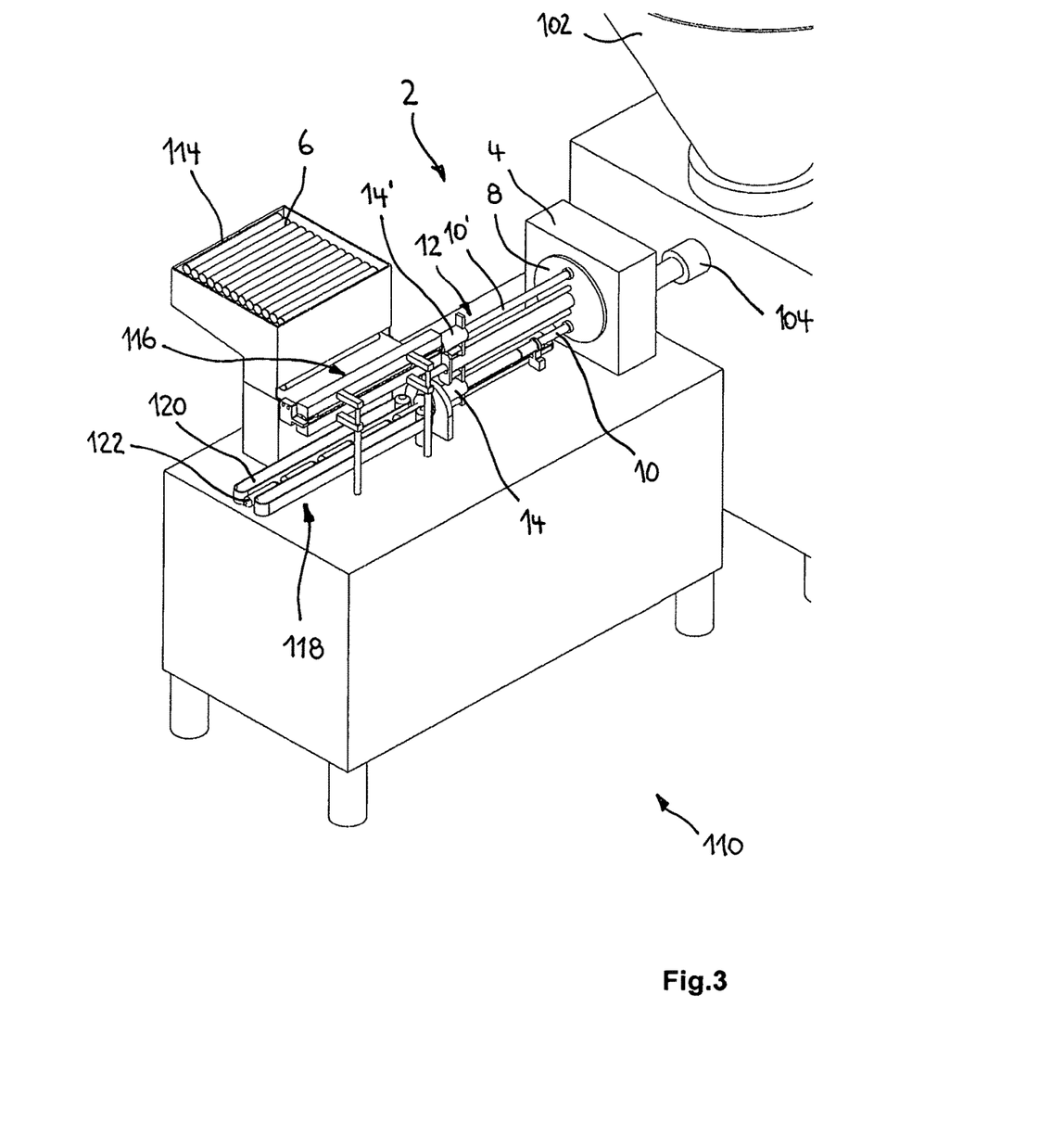
FIG. 3 shows a perspective view of one embodiment of the filling apparatus according to the invention and a casing loading unit for tubular cases.
Figure 4:
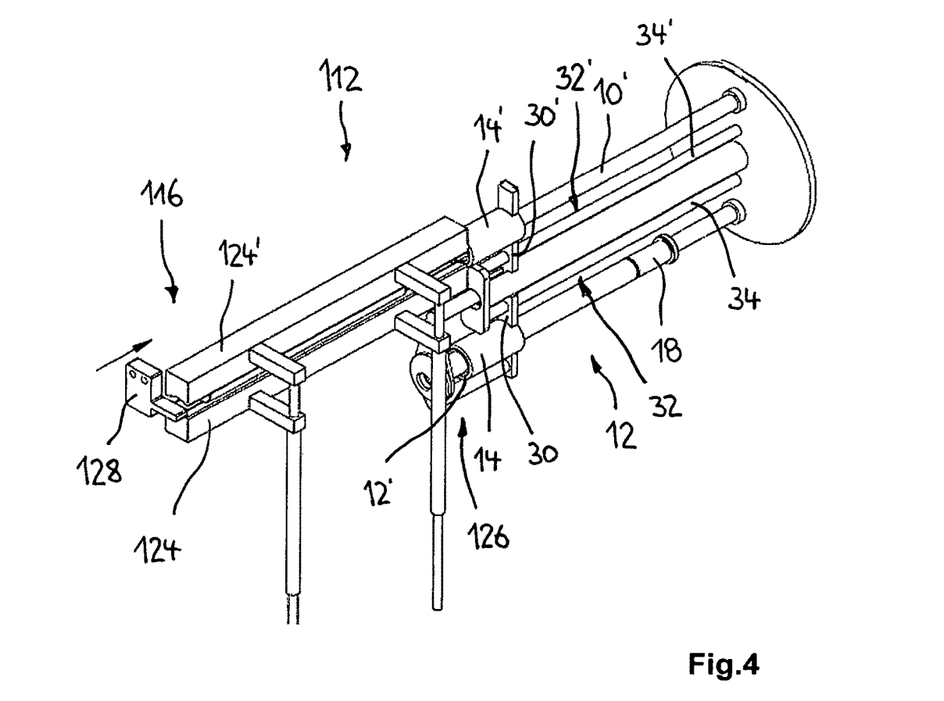
FIG. 4 shows a perspective view of the filling apparatus and support device of FIG. 3 in one of the method steps.
Figure 10:
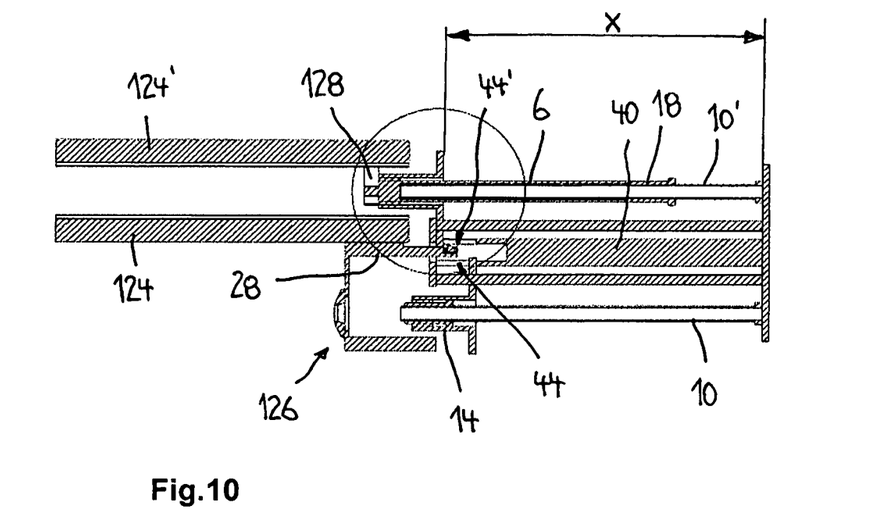
FIG. 10 shows a cross-section view of the filling apparatus and support device of FIG. 9 in one of the successive method steps.

FIG. 3 shows the attachment 110 with its filling apparatus 2 for filling the tubular cases 6 by the pasty material conveyed from the extrusion head 104 in the direction of the twisting-off head 4 of the filling apparatus. In the illustrated structure the twisting-off head 4 has a rotatably mounted receiving portion 8 for two filling tubes 10, 10' arranged on the receiving portion 8. The rotatable receiving portion 8 has an axis of rotation extending in the horizontal plane. Arranged on the receiving portion 8 is a support device 12 for the filling tubes. The support device 12 includes for each filling tube 10, 10' a support portion 14, 14' carried variably in spacing x (as shown in FIGS. 4 and 10) relative to the receiving portion 8. The support portions 14, 14' are held in a displaceable manner in particular at the free end 16, 16' (FIG. 5) of a respective filling tube 10, 10'. The ends 16, 16' of the filling tubes 10, 10' are held or centered substantially with respect to their axis of rotation by the support portions 14, 14'. In that way lateral forces acting on the filling tubes, also referred to as transverse forces, upon pivotal movement of the receiving portion 8 about its axis of rotation, can be reliably absorbed. The support portions 14, 14' which in an embodiment of the invention are in the form of a support sleeve also support the front end of a casing 6 which has been pulled on to the filling tube during the pivotal movement, thereby avoiding buckling of the cases during the pivotal movement of the filling tubes.

The axis of rotation of the receiving portion 8 which is in the form of a pivotal plate and the axes of rotation of the filling tubes 10, 10' extend parallel to each other. In addition, the axes of rotation of the filling tubes 10, 10' are arranged spaced uniformly from the axis of rotation of the receiving portion 8. That permits simplified changing of the filling tubes 10, 10' between the various positions on the filling apparatus 2. In the upper position, the loading position, a tubular case 6 is pulled on to the filling tube 10' while in the lower position, the filling position, filling of a tubular case 6 which has been pulled on to the filling tube 10 is conducted preferably simultaneously at the filling tube 10.

Figure 5:
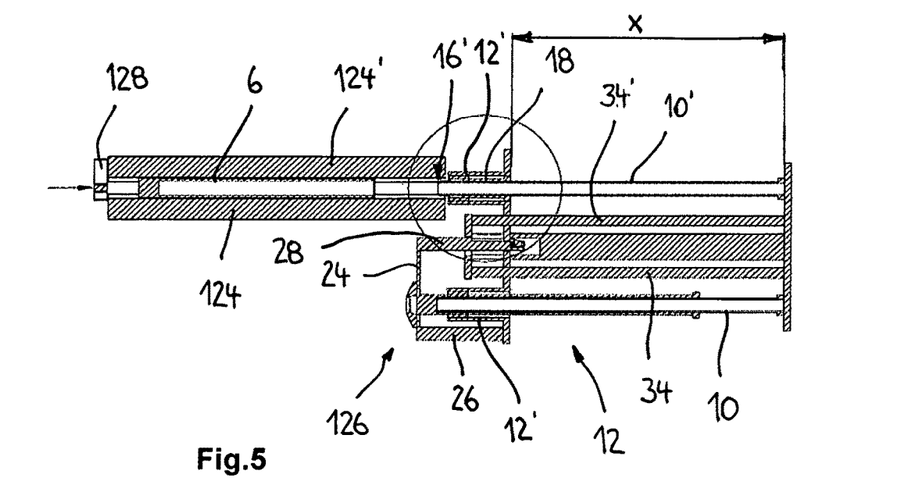
FIG. 5 shows a cross-section view of the filling apparatus and support device of FIG. 4 in one of the method steps.

FIGS. 4 and 5 show an enlarged partial view of the filling apparatus 2 and the support device 12 arranged on the filling apparatus. The casing loading unit 112 with its case gripping device 116 is associated with the filling tube 10' arranged in the upper position. The case gripping device 116 includes two gripping elements 124, 124' which are mounted moveably relative to each other and with which a tubular case 6 is taken over from the case magazine 114 (not shown in greater detail here). The case 6 is at least held between the gripping elements 124, 124'.

Associated with the filling tube 10 arranged in the filling position is a casing braking unit 126, also referred to as the case braking unit, which in particular provides that the case 6 which has been pulled on to the filling tube 10 is held taut during filling thereof and the case 6 is thus pulled off the filling tube 10 in a controlled fashion.

Figure 6:
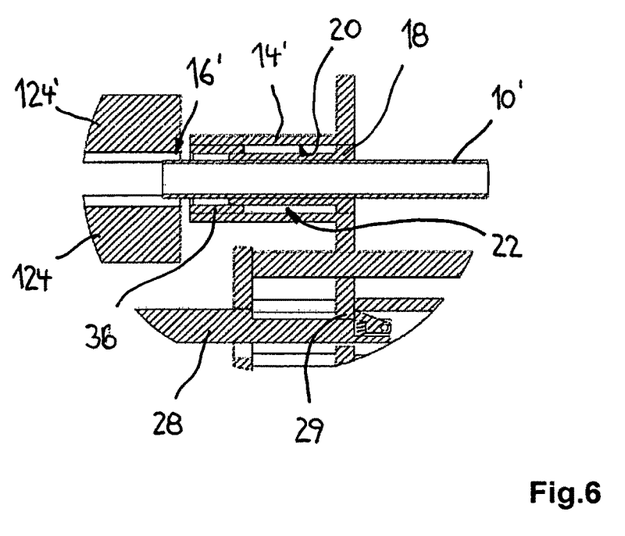
FIG. 6 shows a cross-section view of part of the filling apparatus and support device of FIG. 5 in one of the successive method steps.

FIG. 5 and the detail from FIG. 5 as shown in FIG. 6 show the moment shortly before a case 6 which has been received by way of the case gripping device 116 is pulled on to the filling tube 10'. Before the case is pushed on to the filling tube, the filling tube 10' is centered on the support portion 14' by the casing entrainment ring 18 by way of a support surface 20. The support surface 20 forms a cylindrical receiving space 22 on the support portion 14'. The open end of the case 6 can be brought into contact with the case entrainment ring 18 which is accommodated in the support portion and which is moveable along the filling tube 10', wherein the casing entrainment ring 18 is displaced by the case 6 in the direction of the end of the filling tube 10', that is arranged moveably on the receiving portion 8. The casing loading unit 112 includes a slider 128 which moves in between the gripping elements 124, 124'. By way thereof the case 6 and the casing entrainment ring are moved in the direction of the end of the filling tube 10', that is rotatable on the receiving portion 8.

As FIGS. 4 and 5 further show the casing braking unit 126 is in contact with the front end of the filling tube 10 in the filling position shown downwardly. In addition, arranged at the casing braking unit 126 is a setting device 24 for the support portions 14, 14', that influences the position of the support portions 14, 14' along the filling tubes 10, 10'. The setting device 24 which is coupled to the casing braking unit includes a setting member 26 for adjusting the support portion in the direction of the receiving portion 8 for the filling tubes 10, 10'. In an embodiment of the invention the setting device 24 has a return means 28 adapted to move the support sleeve 12 on the filling tube 10 which is in the upper loading position, in the direction of the open end 16' of the filling tube, when the case is pulled on.

In an embodiment of the invention the support portions 14, 14' each have an entrainment member 29 which can be coupled to a portion of the casing braking unit 126 or the casing loading unit 112. The casing braking unit 126 and/or the casing loading unit for that purpose have a setting device adapted to move the support portions 14, 14' in the direction of the receiving portion 8 while a tubular case is being pulled on to a respective filling tube 10, 10' and/or during contact being made with the casing braking unit 126. In a further embodiment the setting device is adapted to move the support portions 14, 14' in the direction of the open end of a respective filling tube, after the case has been pulled on to the filling tube 10' in the loading position.

The support portions 14, 14' which are carried moveably along the support device 12 each have a guide slide 30, 30' which is moveable along a guide 32, 32' which is oriented parallel to the longitudinal axis of the filling tube and has the guide struts 34, 34'. An entrainment member 29 which can be coupled to the casing braking unit 126 or the casing loading unit 112 can be arranged at the guide slide 30, 30'.

Figure 7:
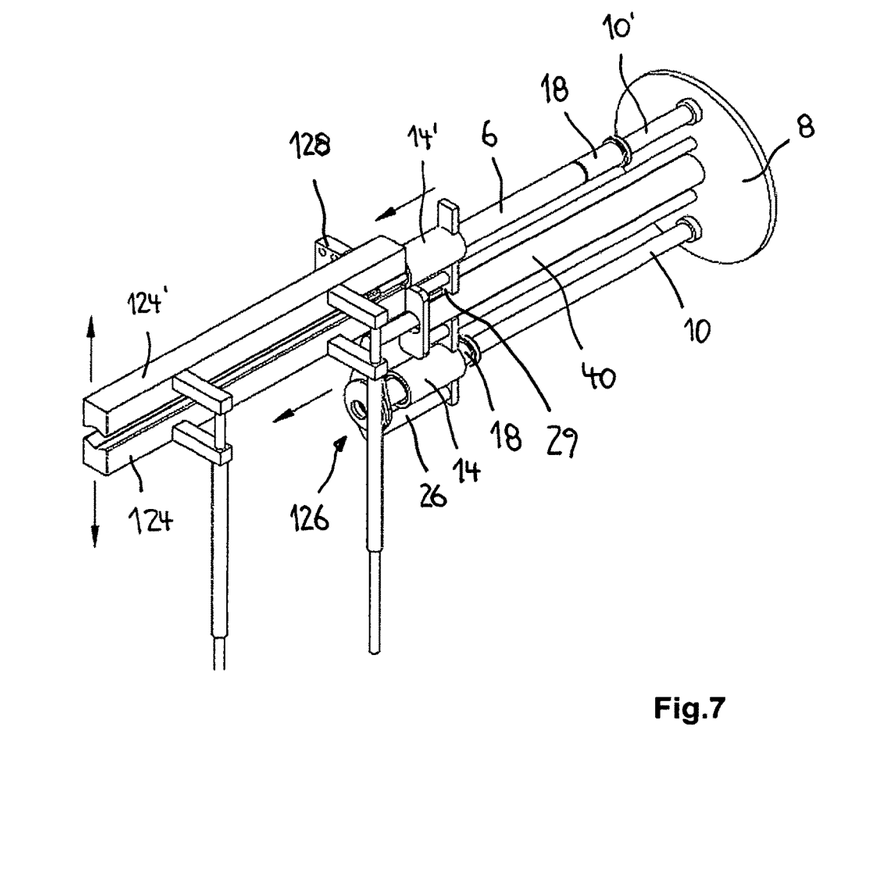
FIG. 7 shows a perspective view of the filling apparatus and support device of FIG. 6 in one of the successive method steps.
Figure 8:
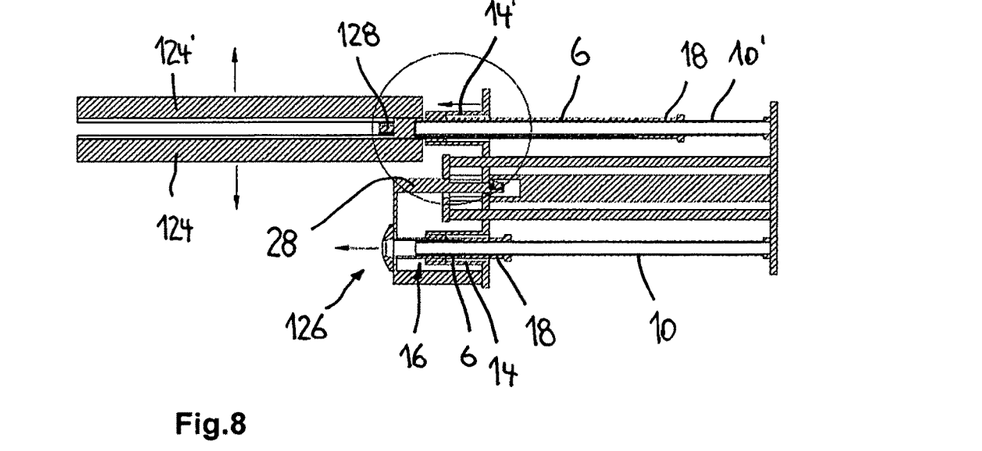
FIG. 8 shows a cross-section view of the filling apparatus and support device of FIG. 7 in one of the successive method steps.

FIGS. 7 and 8 show the loading moment or loading step in which the slider 128 of the casing loading unit 112 has pushed the case 6 on to the filling tube 10' in the upper position on the filling apparatus 2. For that purpose, the spacing between the gripping elements 124, 124' at the case gripping device 116 is to be so selected that the outer periphery of the case 6 is not clamped, but the case can be moved between the gripping elements by the slider 128. Instead of the casing entrainment ring 18 the case 6 now takes over the orientation and centering function of the filling tube 10' relative to the support sleeve 14', wherein the case 6 is in contact with a support surface 20 (FIG. 11) at the support portions 14, 14' which are respectively in the form of a support sleeve. After the case 6 has been pushed on, the slider 128 remains in the position in which it has approached the free end 16' of the filling tube 10'. In addition, as shown clearly in FIGS. 7 and 8, filling of the case 6 on the filling tube 10 is conducted in the lower filling position, the casing entrainment ring 18 being moved on the filling tube 10 in the direction of the front end 16.

In the following step as shown by the arrows indicating movement in FIGS. 7 and 8 and FIGS. 9 through 11 the gripping elements 124, 124' are opened and then the casing braking unit 126 is moved out of contact with the end 16 of the filling tube 10 in the lower position on the filling apparatus 2. Instead of being oriented by way of the casing braking unit 126 the filling tube 10 in the lower position is now oriented by way of the casing entrainment ring 18 which is moved to the end 16 of the filling tube 10, relative to the support portion 14. At the end of the operation of filling the case 6 which had been pulled on to the filling tube 10 the ring was moved into the support portion 14 in the form of the support sleeve, wherein the outer periphery of the casing entrainment ring 18 is in contact with the support surface 20 on the support portion 14 and performs a corresponding centering function. At the same time as the casing braking unit is brought out of contact on the filling tube 10 the support portion 14' is moved on the filling tube 10' by way of the return means 28 of the setting device 24 into its forward position, e.g., in the direction of the free end of the filling tube 10'.

Figure 9:
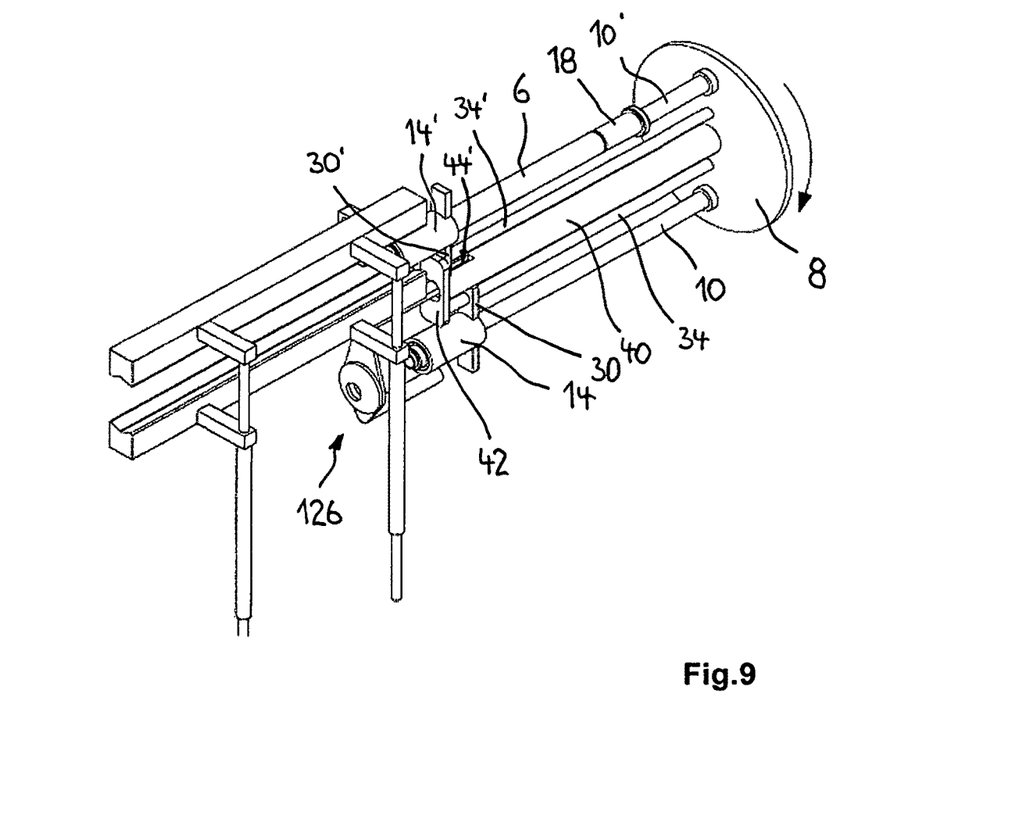
FIG. 9 shows a perspective view of the filling apparatus and support device of FIG. 8 in one of the successive method steps.
Figure 11:
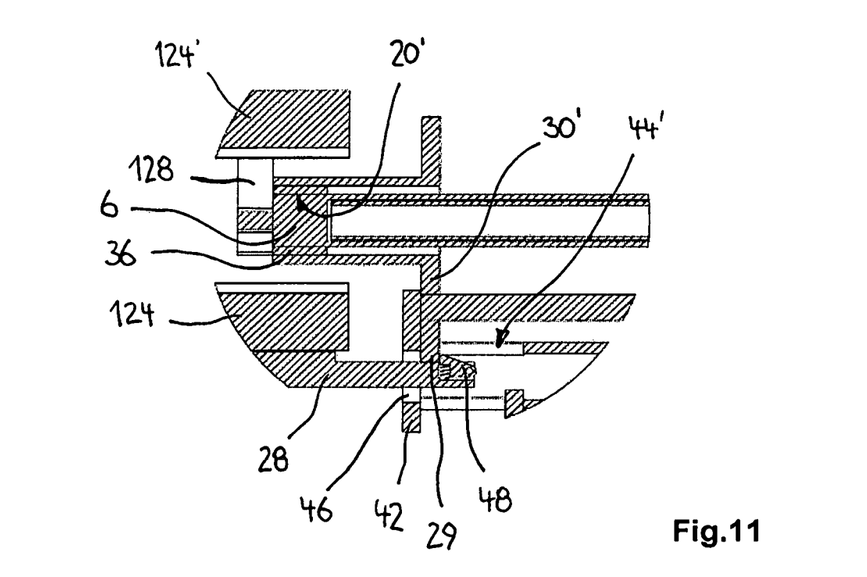
FIG. 11 shows a cross-section view of part of the filling apparatus and support device of FIG. 10 in one of the successive method steps.

As can be clearly seen from FIGS. 9 through 11, the slider 128 remains in the position in which it has approached the end of the filling tube 10', during the movement of the support portion 14'. Movement of the support portion 14' is conducted by way of the return means 28 of the setting device 24 that is coupled to the casing braking unit 126. In the illustrated embodiment the return means 28 engages the guide slide 30' for the support portion 14'. The support portion 14' which is equipped with an insert 36 adapted to the diameter of the case 6 which is to be pushed over the filling tube 10' engages over the front end of the case 6 almost completely after displacement into its forward position.

Each support portion 14, 14' is accommodated in a displaceable manner with its guide slides 30, 30' along the guide struts 34, 34' of the guide 32, 32'. In addition, the support device 12 has a central strut 40 which is arranged coaxially with respect to the axis of rotation of the receiving portion 8 and in relation to which the guide struts 34, 34' of a respective guide are arranged to extend in parallel relationship. The guide struts 34, 34' and the central strut 40 which are arranged non-rotatably on the receiving portion 8 of the twisting-off head 4 are respectively fixedly coupled together at the end by way of a connecting flange 42, the support device 12 providing a fixed frame structure thereby. As can be seen from the detail of FIG. 10 as shown in FIG. 11 provided in the central strut 40 are recesses 44, 44' which correspond to the guide slides 30, 30' and in which portions of the guide slides are moveably accommodated.

The return means 28 which in a preferred embodiment is arranged at the casing braking unit 126 engages into the central strut 40 by way of an opening 46 in the connecting flange 42 and cooperates with the entrainment member 29 of a respective guide slide 30, 30' of a support portion 14, 14' which is in the upper loading position of the filling apparatus. The return means 28 has a spring-loaded latching element 48 which can be brought into operative connected relationship with the entrainment member 29 on the guide slide 30, 30', the latching element 48 engaging behind regions of the guide slide. Upon displacement, in particular upon disengagement, of the casing braking unit 126 with the filling tube 10 in the filling position the guide slide 30, 30' and the respective support portion 14, 14' is automatically moved into the forward position.

After the casing braking unit 126 is separated from the filling tube 10 in the lower position and the support portion 14' has been moved to the forward end of the filling tube 10' the receiving portion 8 of the twisting-off head 4 is turned or pivoted through 180° as indicated by the motion arrow in FIG. 9. As a result, the filling tube 10' which is now fitted with the case is moved into the filling position and the "empty" filling tube 10' is moved into the upper loading position. The filling tube 10 which is now in the loading position is again fitted with a fresh case 6, beginning as in FIG. 4. The filling tube 10' which is in the lower position and the front end 16' thereof is brought into contact with the casing braking unit 126, wherein the casing braking unit is pushed on to the end 16' of the filling tube or on to the end of the case 6. At the same time the setting member 26 arranged at the casing braking unit 126, upon displacement of the casing braking unit 126, moves the support portion 14' into its rearward position in the direction of the receiving portion 8. That brings about the initial state shown in FIG. 4 and a fresh filling and equipping operation at the filling apparatus 2 can start.

Similar or identical components are denoted by the same reference.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCES 2 filling apparatus
4 twisting-off head
6 case
8 receiving portion
10, 10' filling tube
12 support device
14, 14' support portion
16, 16' end
18 casing entrainment ring
20, 20' support surface
22 receiving space
24 setting device
26 setting member
28 return means
30, 30' guide slide
32, 32' guide
34, 34' guide strut
36 insert
40 central strut
42 connecting flange
44 recess
46 opening
48 latching element
100 machine
102 filling hopper
104 extrusion head
106 delivery tube
110 attachment
112 casing loading unit
114 case magazine
116 casing gripping device
118 conveyor device
120 conveyor element
122 sausages
124, 124' gripping element
126 casing braking unit
128 slider

What is claimed is:
1. An apparatus for filling tubular cases with a pasty material, comprising:
at least one filling tube on to which a case which is to be filled with the material can be pulled,
a receiving portion receiving a first end of the filling tube,
a casing braking unit which is associated with an oppositely disposed second open end and which can be brought into operative connected relationship with the case which has been pulled over the filling tube, and
a support device arranged at the receiving portion for the filling tube,
wherein the support device has at least one support portion which is variable in spacing relative to the receiving portion and which is adapted to be brought into contact with a gathered case on the filling tube for receiving transverse forces.
2. The filling apparatus of claim 1, wherein the support portion has at least one support surface which at least partially surrounds the case on the filling tube.
3. The filling apparatus of claim 1, wherein the support portion has a support surface which can be brought regionwise into contact with an outside periphery of a casing entrainment ring displaceable along the filling tube.

4. The filling apparatus of claim 3, wherein the support surfaces respectively form a cylindrical receiving space for the case and the casing entrainment ring.

5. The filling apparatus of claim 4, wherein the support portion has a centering portion for the casing entrainment ring which can be portion-wise received in the receiving space.

6. The filling apparatus of claim 3, wherein the support portion is a support sleeve with one or more support surfaces for the gathered case and/or the casing entrainment ring.

7. The filling apparatus of claim 1, wherein the support portion has a guide slidingly moveable along a guide of the support device, said guide extending parallel to a longitudinal axis of the filling tube.

8. The filling apparatus of claim 7, wherein each guide has one or more guide struts arranged in a stationary manner on the receiving portion.

9. The filling apparatus of claim 1, wherein arranged on the support portion is an entrainment member by which the support portion is moveable along the filling tube.

10. The filling apparatus of claim 9, wherein the entrainment member can be coupled to a portion of the casing braking unit or a casing loading unit.

11. The filling apparatus of claim 1, wherein the support portion is adapted to be moved in a direction of the receiving portion before or during operation of pulling the case on to the filling tube.

12. The filling apparatus of claim 1, wherein the support portion is disposed in a region of the open end of the filling tube during filling of the case and/or during a pivotal movement of the filling tube.

13. The filling apparatus of claim 1, wherein associated with the support portion is a return means which is adapted to move the support portion into a predetermined position relative to the filling tube after the case has been pulled on.

14. The filling apparatus of claim 13, wherein the support portion can be equipped with an insert which is matched in inside diameter to the case to be processed.

15. The filling apparatus of claim 1, wherein a plurality of filling tubes is arranged on the receiving portion, wherein each filling tube is mounted by way of a support portion which is variable in a longitudinal direction in the spacing relative to the receiving portion.

16. The filling apparatus of claim 15, wherein the receiving portion is in the form of a twisting-off head having an axis of rotation which is respectively oriented parallel to a longitudinal axis of the filling tube.

17. The filling apparatus of claim 16, wherein the support device has a central strut which is arranged coaxially relative to the axis of rotation of the receiving portion and in relation to which the guide struts of a respective guide are arranged in parallel relationship.

18. The filling apparatus of claim 1,
wherein the support portion has at least one support surface which at least partially surrounds the case on the filling tube,
wherein the support portion has a support surface which can be brought region-wise into contact with an outside periphery of a casing entrainment ring displaceable along the filling tube,
wherein the support surfaces respectively form a cylindrical receiving space for the case and the casing entrainment ring,
wherein the support portion is a support sleeve with one or more support surfaces for the gathered case and/or the casing entrainment ring,
wherein the support portion has a centering portion for the casing entrainment ring which can be portion-wise received in the receiving space,
wherein the support portion has a guide slidingly moveable along a guide of the support device, said guide extending parallel to a longitudinal axis of the filling tube,
wherein arranged on the support portion is an entrainment member by which the support portion is moveable along the filling tube,
wherein the entrainment member can be coupled to a portion of the casing braking unit or a casing loading unit,
wherein the support portion is adapted to be moved in a direction of the receiving portion before or during operation of pulling the case on to the filling tube,
wherein the support portion is disposed in a region of the open end of the filling tube during filling of the case and/or during a pivotal movement of the filling tube,
wherein associated with the support portion is a return means which is adapted to move the support portion into a predetermined position relative to the filling tube after the case has been pulled on,
wherein the support portion can be equipped with an insert which is matched in inside diameter to the case to be processed,
wherein each guide has one or more guide struts arranged in a stationary manner on the receiving portion,
wherein a plurality of filling tubes is arranged on the receiving portion, wherein each filling tube is mounted by way of a support portion which is variable in a longitudinal direction in the spacing relative to the receiving portion,
wherein the receiving portion is in the form of a twisting-off head having an axis of rotation which is respectively oriented parallel to a longitudinal axis of the filling tube,
wherein the support device has a central strut which is arranged coaxially relative to the axis of rotation of the receiving portion and in relation to which the guide struts of a respective guide are arranged in parallel relationship, and
wherein arranged at the free end of the central strut is a guide portion of the casing braking unit, which guide portion is moveable portion-wise along the central strut.

19. A support device for at least one filling tube of an apparatus for filling tubular cases with pasty material, comprising:
a support portion for the filling tube, which can be arranged variably in a longitudinal direction of the filling tube in the spacing relative to a receiving portion receiving the filling tube and is adapted to be brought into contact with a case gathered on the filling tube for receiving transverse forces,
wherein the support device is adapted for use on the apparatus for filling tubular cases of claim 1.

20. A filling machine for producing sausages of pasty material, comprising:
a filling hopper for receiving the pasty material,
a conveyor pump for conveying the pasty material, and
the apparatus for filling tubular cases with a pasty material of claim 1, and
at least one casing loading unit for gathered sausage skin casings with two gripping elements which are held moveably relative to each other.

* * * * *